(12) United States Patent
Johnson et al.

(10) Patent No.: US 8,371,096 B2
(45) Date of Patent: Feb. 12, 2013

(54) SICKLE BAR ASSEMBLY

(75) Inventors: Keith A. Johnson, Kewaskum, WI (US);
Neal J. Stoffel, Campbellsport, WI (US);
Juan G. Sotelo, Fond du lac, WI (US)

(73) Assignee: Kondex Corporation, Lomira, WI (US)

( * ) Notice: Subject to any disclaimer, the term of this patent is extended or adjusted under 35 U.S.C. 154(b) by 0 days.

(21) Appl. No.: 13/154,931

(22) Filed: Jun. 7, 2011

(65) Prior Publication Data

US 2012/0311988 A1    Dec. 13, 2012

(51) Int. Cl.
*A01D 34/13* (2006.01)
*A01D 34/18* (2006.01)

(52) U.S. Cl. .................... 56/298; 56/299

(58) Field of Classification Search ............ 30/223, 30/241, 208, 309; 56/298, 300, 296
See application file for complete search history.

(56) References Cited

U.S. PATENT DOCUMENTS

| | | | | |
|---|---|---|---|---|
| 1,340,868 A * | 5/1920 | Aidlotte | ............... | 56/300 |
| 2,133,277 A * | 10/1938 | Bennett | ............... | 56/298 |
| 2,714,280 A * | 8/1955 | Baker | ............... | 56/291 |
| 4,805,390 A * | 2/1989 | Majkrzak | ............... | 56/300 |
| 4,854,114 A * | 8/1989 | Speck | ............... | 56/296 |
| 4,942,728 A | 7/1990 | Loring | | |
| 5,024,051 A * | 6/1991 | Glass et al. | ............... | 56/297 |
| 5,161,357 A | 11/1992 | Braunberger et al. | | |
| 6,886,316 B2 * | 5/2005 | Schumacher | ............... | 56/296 |
| 7,861,505 B1 * | 1/2011 | Figgins et al. | ............... | 56/296 |
| 2005/0103637 A1 * | 5/2005 | Yamasaki et al. | ............... | 205/170 |
| 2010/0050587 A1 | 3/2010 | Stoffel | | |
| 2010/0146796 A1 * | 6/2010 | Geromiller | ............... | 30/223 |

OTHER PUBLICATIONS

Kondex Corporation; Sickle Assemblies; 2008; 2 pages; Kondex Corporation, Lomira, WI, USA.
Kondex Corporation; Lickety-Split Sickle Assemblies; 2008; 2 pages; Kondex Corporation, Lomira, WI, USA.
Kondex Corporation; Sickle Sections; 2008; 2 pages; Kondex Corporation, Lomira, WI, USA.

* cited by examiner

*Primary Examiner* — Arpad Fabian-Kovacs
(74) *Attorney, Agent, or Firm* — Reinhart Boerner Van Deuren P.C.

(57) ABSTRACT

A sickle bar assembly employs a plurality of laminated strips that are secured and that may be stacked vertically upon each other in abutting relation to form a sickle bar. The individual sickle sections are secured to the sickle bar in side-by-side relation. Laminated stacks may also be joined to each other by way of a splice joint to provide for even longer bar. The strips may be heat treated strips of steel as opposed to cold rolled steel or other high strength strip material.

16 Claims, 9 Drawing Sheets

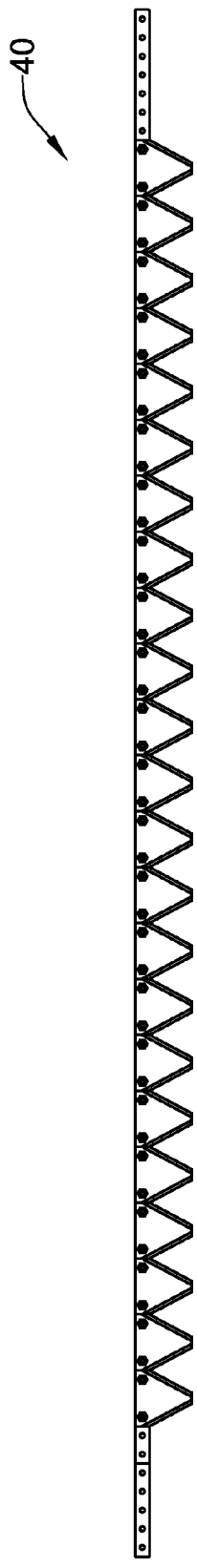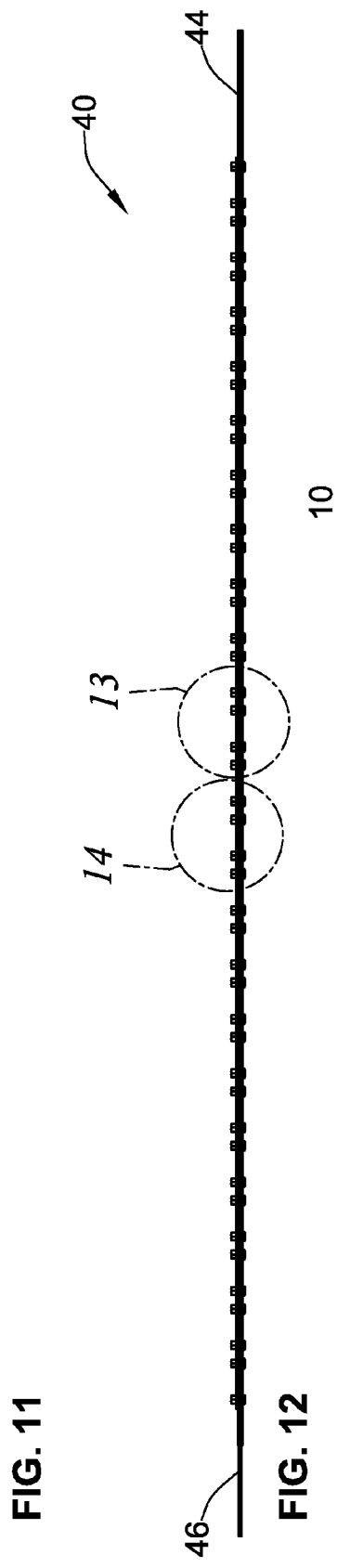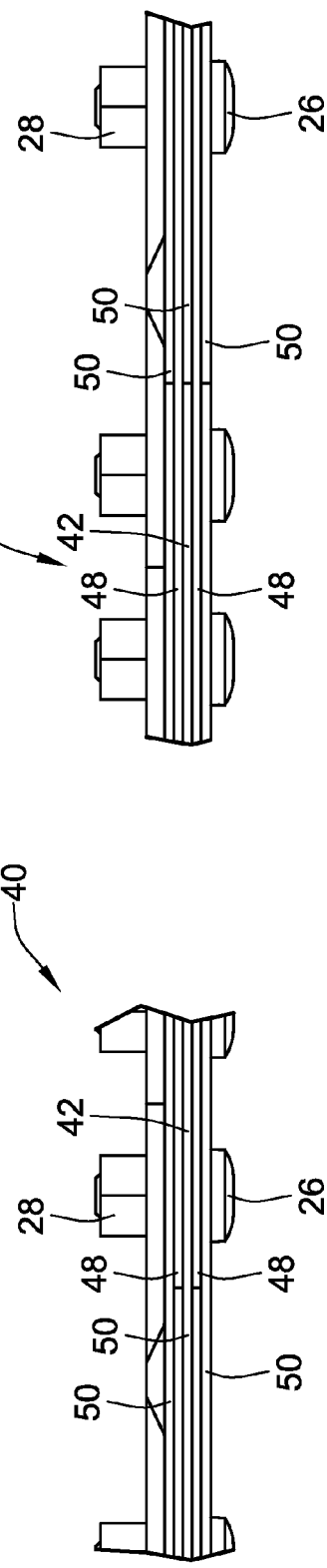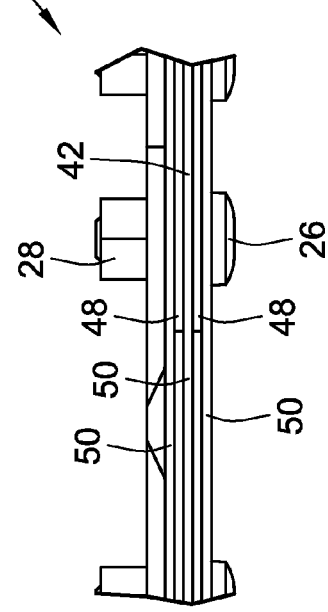
FIG. 11
FIG. 12
FIG. 13
FIG. 14

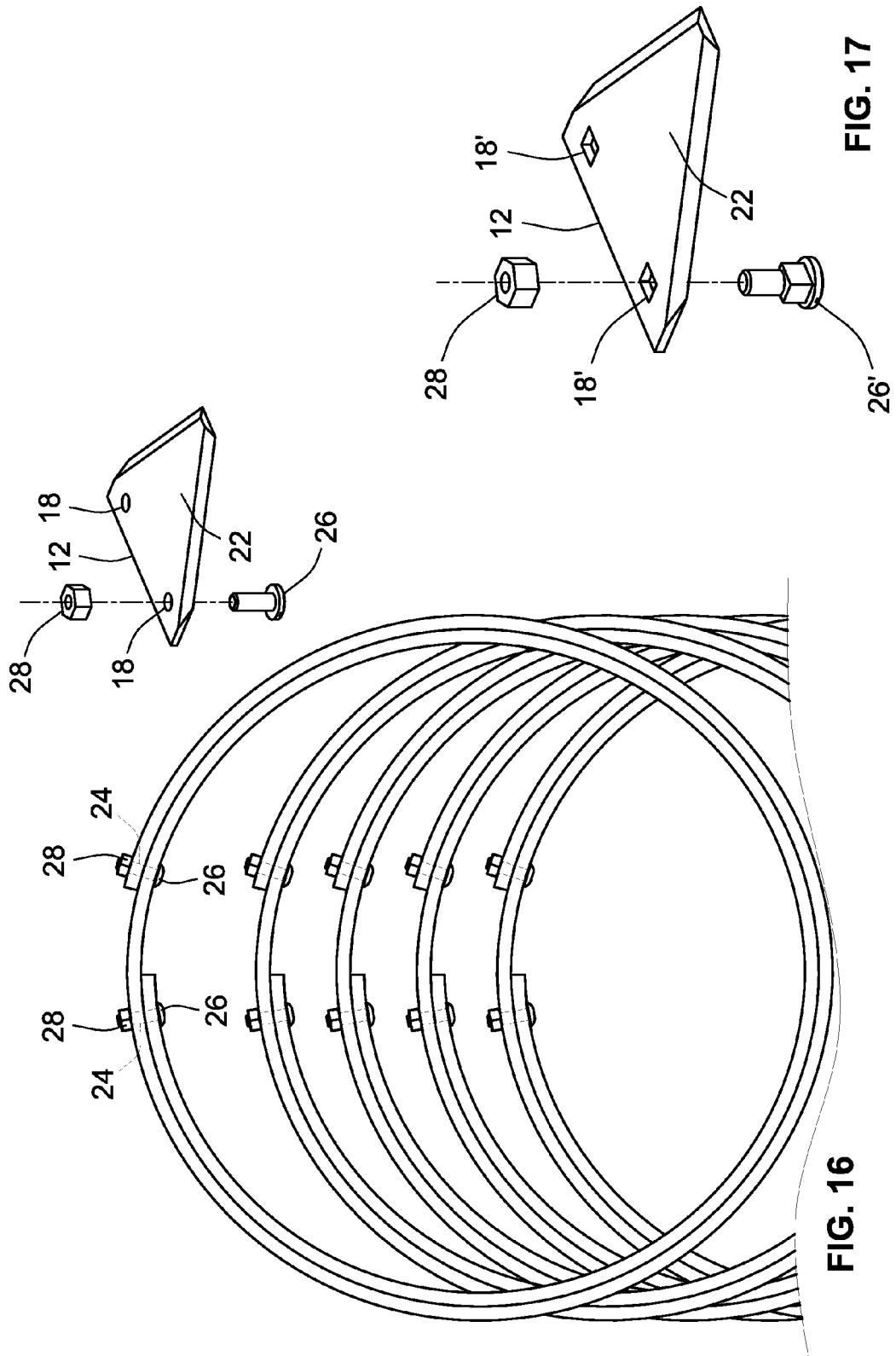

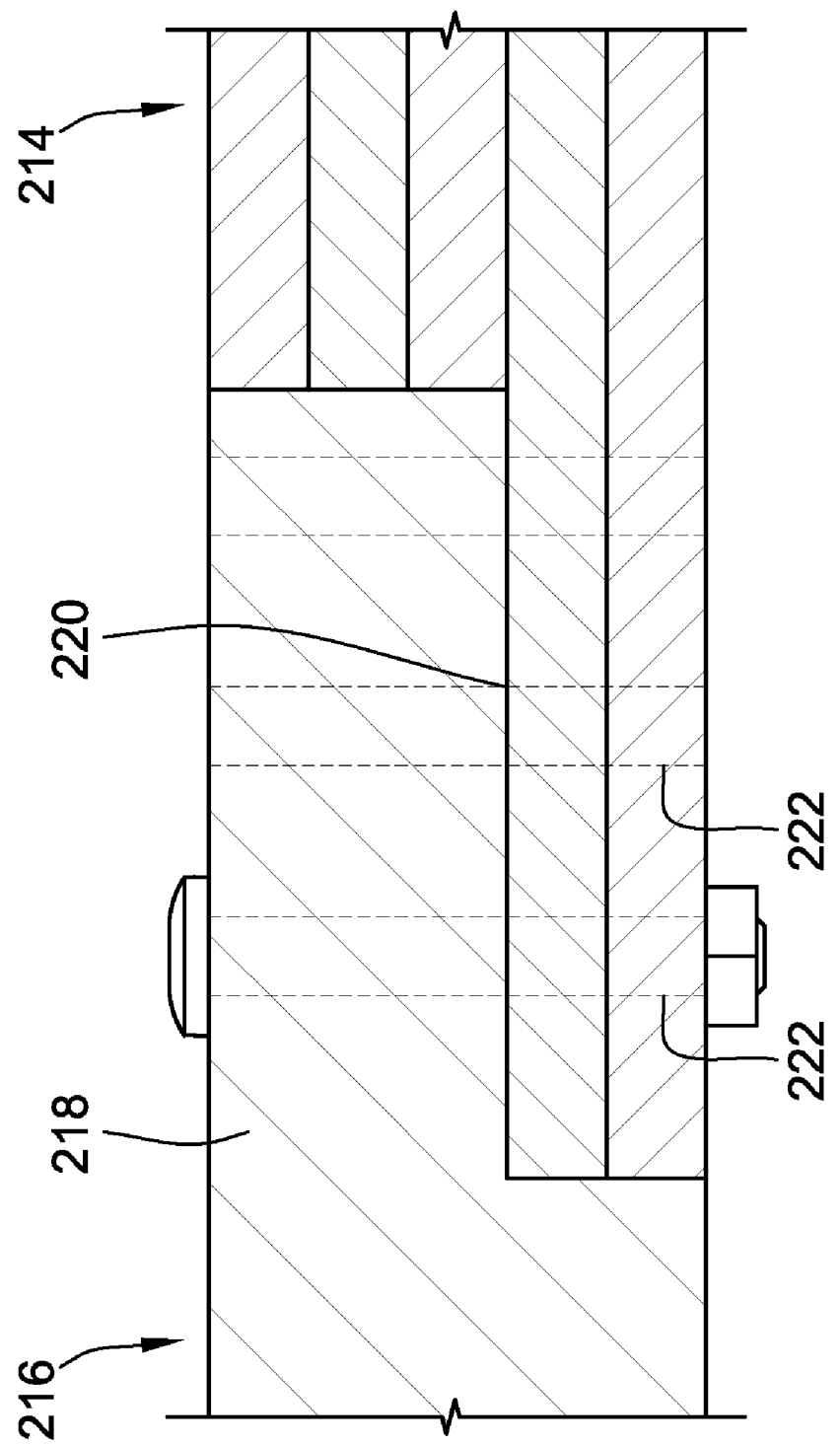

SICKLE BAR ASSEMBLY

FIELD OF THE INVENTION

This invention generally relates to sickles, and more particularly relates to an improvement in the construction of the sickle bar that mounts individual sickle sections.

BACKGROUND OF THE INVENTION

As agricultural headers get larger and manufacturers require higher sickle speeds, the stresses imparted on the sickle assembly knifeback have increased. Standard cold rolled steel materials are used in such sickle bars and typically have a tensile strength less than 160 KSI. Various sickle bar assemblies are shown, for example, in a number of patents including U.S. Pat. Nos. 4,942,728; 5,161,357, and U.S. Patent Publication Number 2010/0050587. The present application is directed toward improvements over the state of the art.

BRIEF SUMMARY OF THE INVENTION

The present application is directed toward a variety of patentable features and aspects.

One inventive aspect relates to a sickle bar assembly, whereby a sickle bar can be formed by way of a laminated stack of elongated strip of metal material. In accordance therewith, a sickle bar assembly comprises a plurality of sickle sections and a plurality of elongated strips secured together forming a sickle bar. The plurality of sickle sections are secured to the sickle bar in side-by-side relation. Each elongated strip spans at least four sickle sections, and preferably longer.

A feature which may be employed according to the above aspect is that the strips can have a strength greater than about 180 KSI and formed from a metal (or other material) other than cold rolled steel. For example, the strips may be heat treated strips of sheet steel having a strength of about 250 KSI or even greater depending upon the exact material selected. Another contemplated material that may be employed in the alternative to heat treated sheet steel is high strength low alloy (HSLA), which also has, or can have, a much higher strength characteristic than cold rolled steel.

Yet another aspect of the present invention is directed toward an interleaved splice joint that may be employed with such a laminated stack. A sickle bar assembly may comprise a plurality of sickle sections and a sickle bar. The plurality of sickle sections are secured to the sickle bar. The sickle bar comprises at least two bar segments, including a first bar segment and a second bar segment with each bar segment comprising at least three elongated strips that are secured together. A splice joint is formed between the elongated strips of the first and second bar segments with ends of at least two of the elongated strips of each of the first and second bar segments being offset relative to each other. In this manner, the elongated strips of the first and second bar segments are interleaved with each other.

An even further aspect of the invention may be directed toward a sickle bar kit, which can be used to provide for much easier shipment in a compact envelope that is much shorter than the eventual sickle bar assembly that will be assembled from such a kit. In particular, the elongated strips used to form a laminated stack can be coiled up for shipment and then uncoiled with a generally flat state in an unwound state for assembly. The sickle bar kit, according to this aspect, is adapted for use with a plurality of sickle sections with each sickle section having a support base and at least one mounting hole between opposed sides thereof and a knife portion projecting from the support base. The sickle bar assembly comprises a plurality of elongated strips with each strip being wound in a coil in a shipping position and having a generally flat state in an unwound state. The shape of the coil is sufficiently large so as not to deform the strips past the yield point of the material of the strips so that the memory in the material causes it to lie generally flat for forming a bar upon release from the coil. Each strip has regularly spaced mounting apertures that are adapted to align with mounting holes of sickle sections for mounting sickle sections in side-by-side relation along the length of the strips. The strips are adapted to be secured together to form a sickle bar. The kit may also further include the plurality of fasteners and sickle sections, depending upon what needs to be supplied to the end user.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 11 and 12 are top and front elevation views of the assembled sickle bar assembly of FIG. 10 in an assembled state;

FIGS. 13 and 14 are enlarged detail views taken about Circles 13 and 14 of FIG. 12;

FIG. 16 is a perspective illustration of a sickle bar assembly kit with laminated strips being wound in a coiled shipping state according to an embodiment of the present invention;

FIG. 17 is a further illustration showing a non-round bolt hole design that may be employed with sickle bar assemblies of any of the embodiments of the present invention;

FIG. 18 is an illustration according to a further embodiment showing a laminated stack of elongated strips in combination and spliced to a cold rolled steel bar to thereby form a sickle bar.

DETAILED DESCRIPTION OF THE INVENTION

Figure 1:
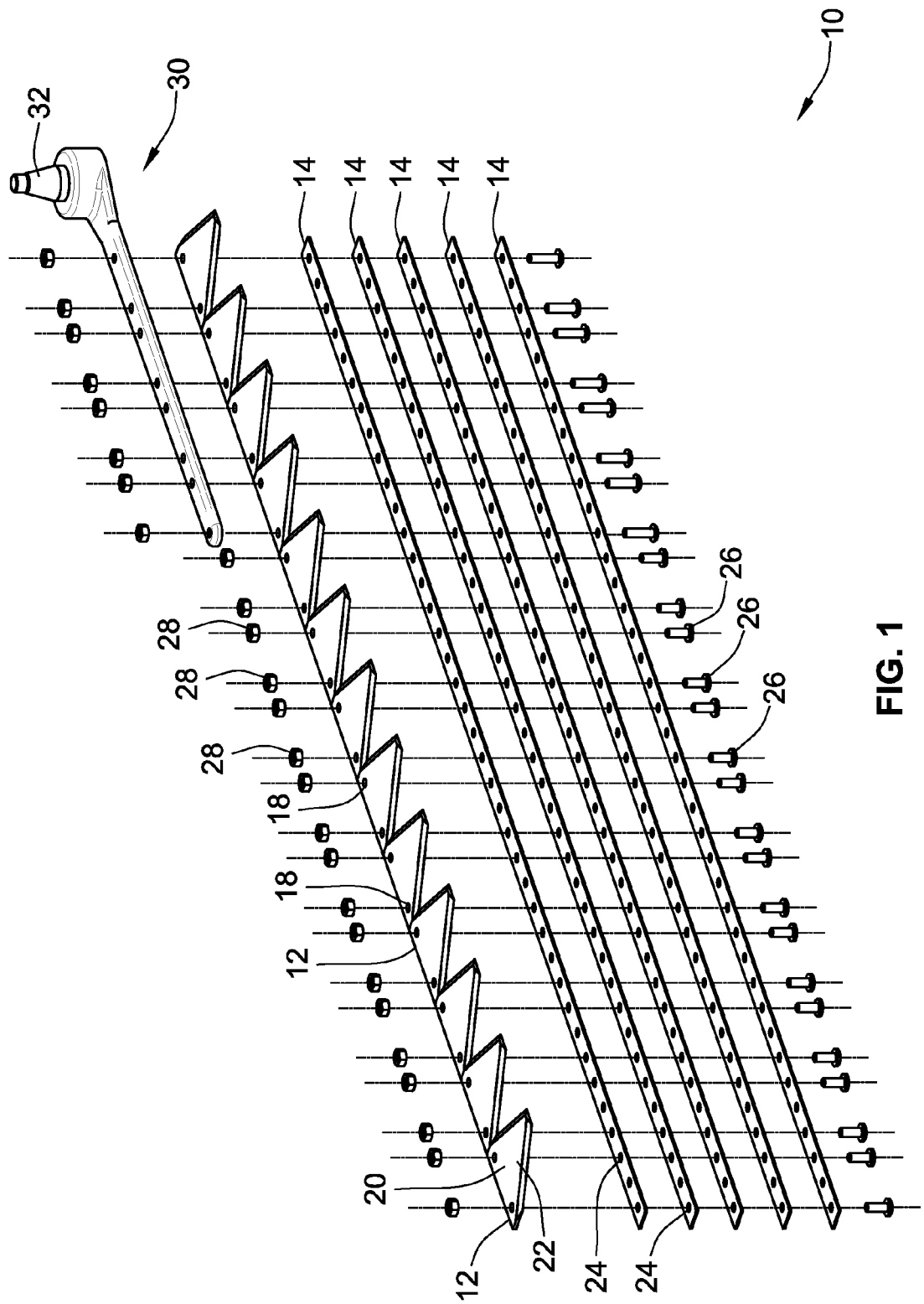
FIG. 1 is an exploded assembly view of a sickle bar assembly in accordance with a first embodiment of the present invention.
Figure 2:
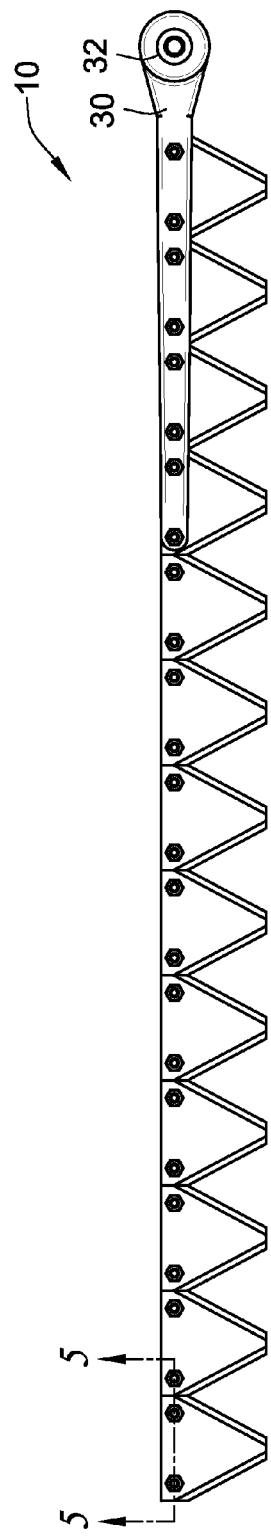
FIG. 2 is a top plan view of the sickle bar assembly shown in FIG. 1, but in an assembled state.
Figure 3:
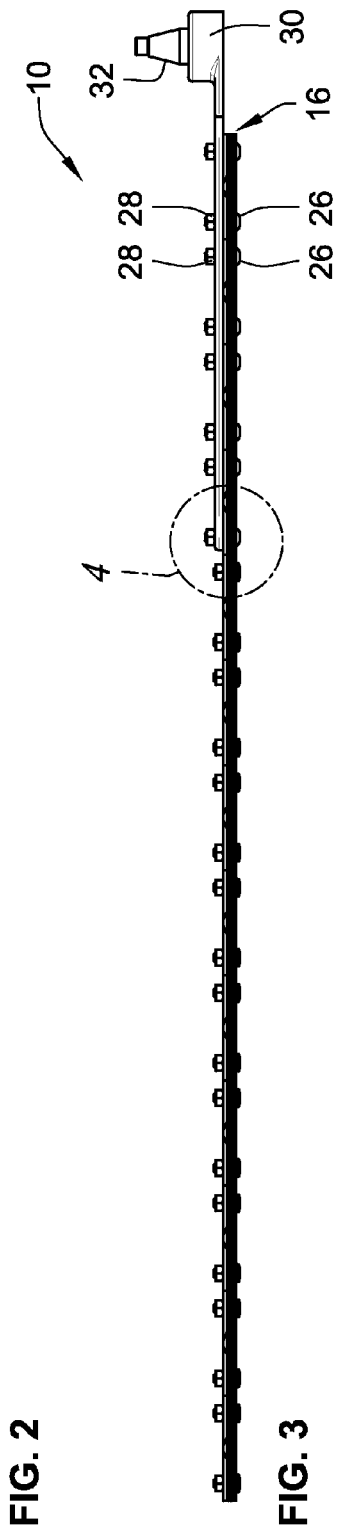
FIG. 3 is a front side elevation view of the sickle bar assembly of FIG. 2.
Figure 5:
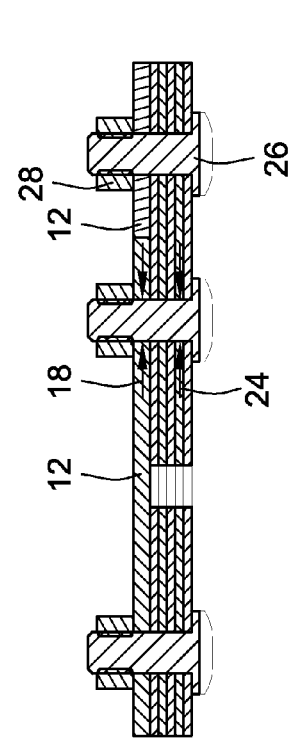
FIGS. 4 and 5 are enlarged detailed views of FIGS. 2 and 3, with FIG. 5 being a cross section taken about Section 5.5 of FIG. 2 and FIG. 4 being an enlarged portion of FIG. 3 taken about Circle 4.
Figure 4:
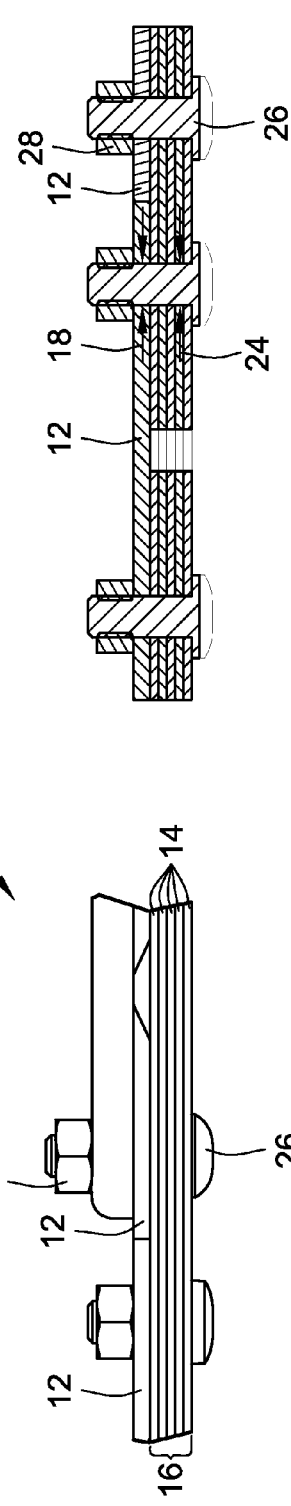
Figure 6:
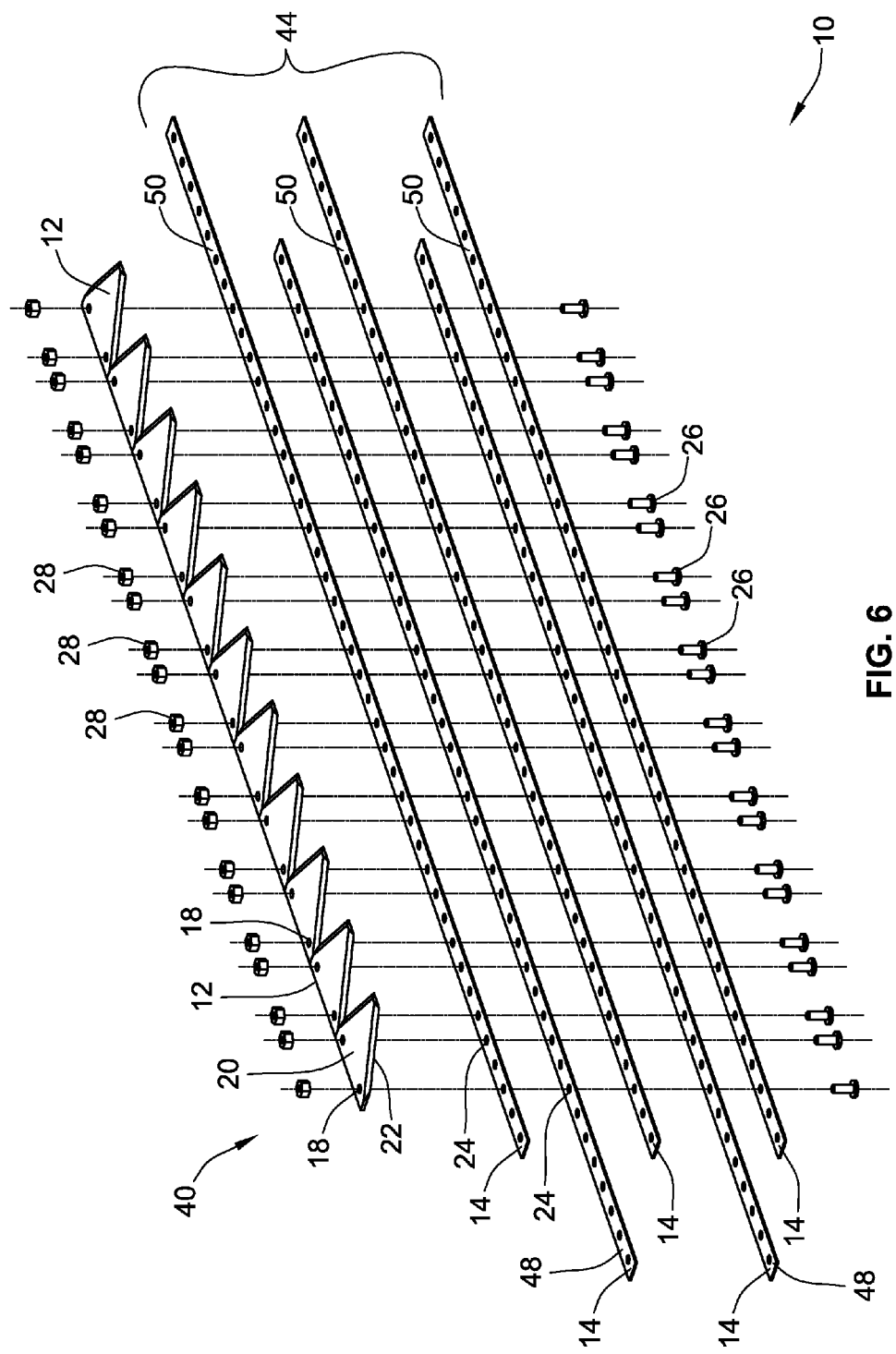
FIG. 6 is an exploded assembly view of a bar segment of a sickle bar assembly according to a second embodiment of the present invention.
Figure 7:
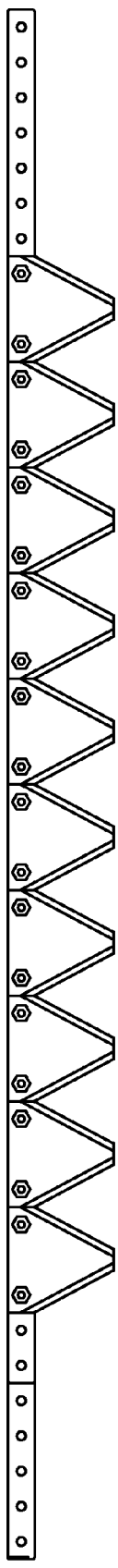
FIGS. 7 and 8 are top and front side views of the bar segment shown in FIG. 6, but in an assembled state.
Figure 8:
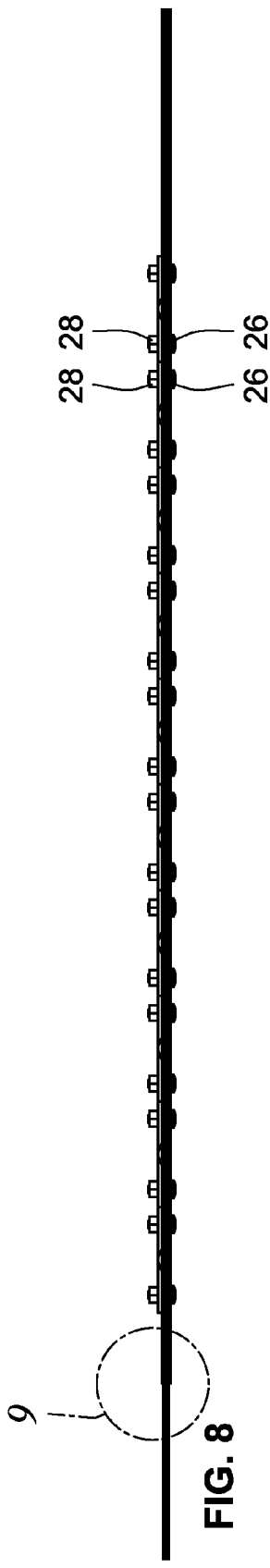
Figure 9:
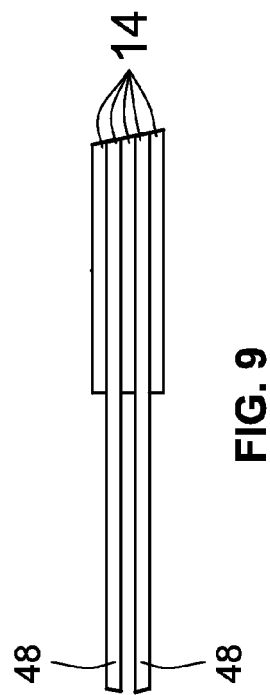
FIG. 9 is an enlarged detail view taken about Circle 9 in FIG. 8.
Figure 10:
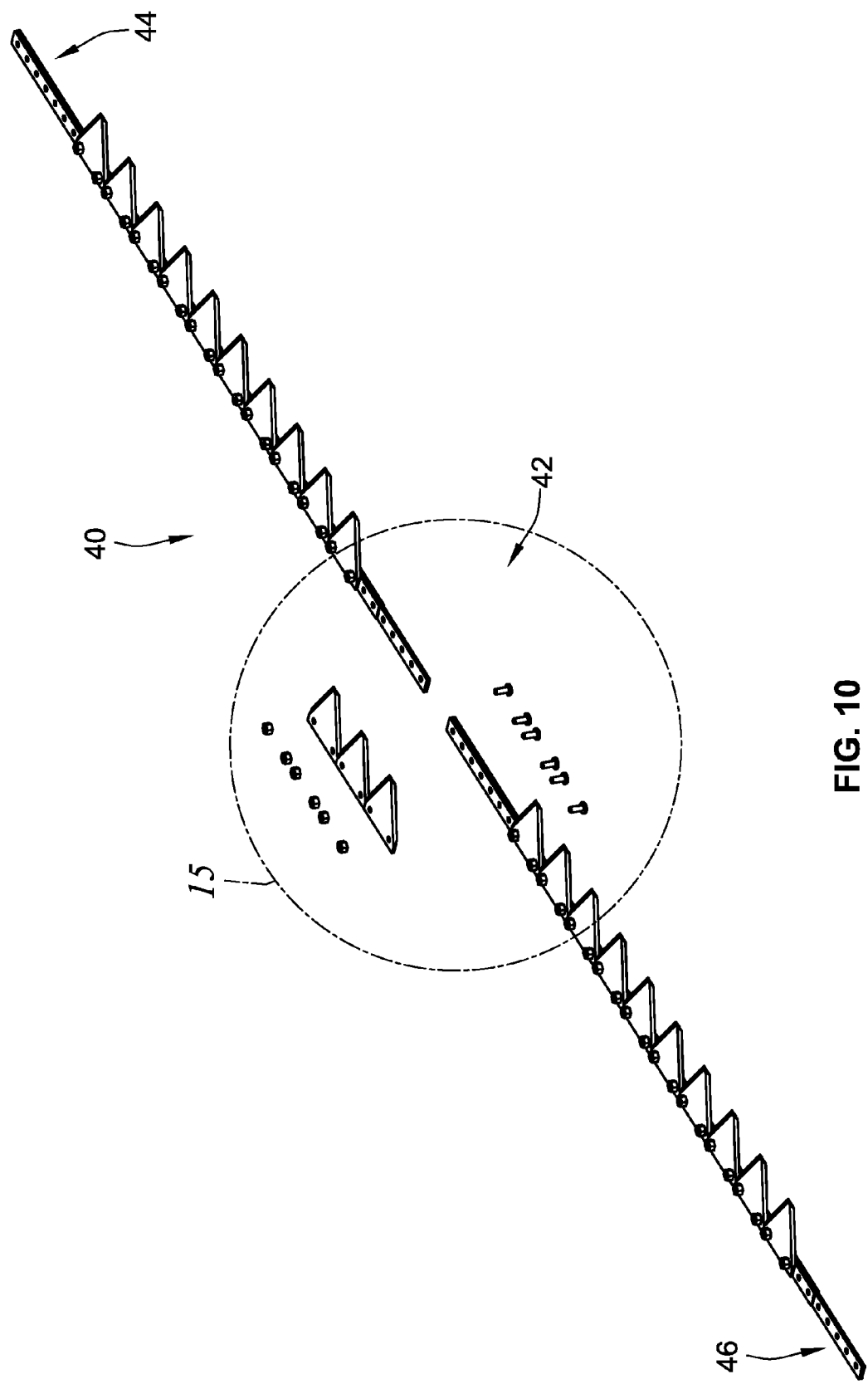
FIG. 10 is a partially exploded assembly view of the bar segment shown in FIG. 6 being assembled with an adjacent second bar segment in accordance with an embodiment of the present invention.
Figure 15:
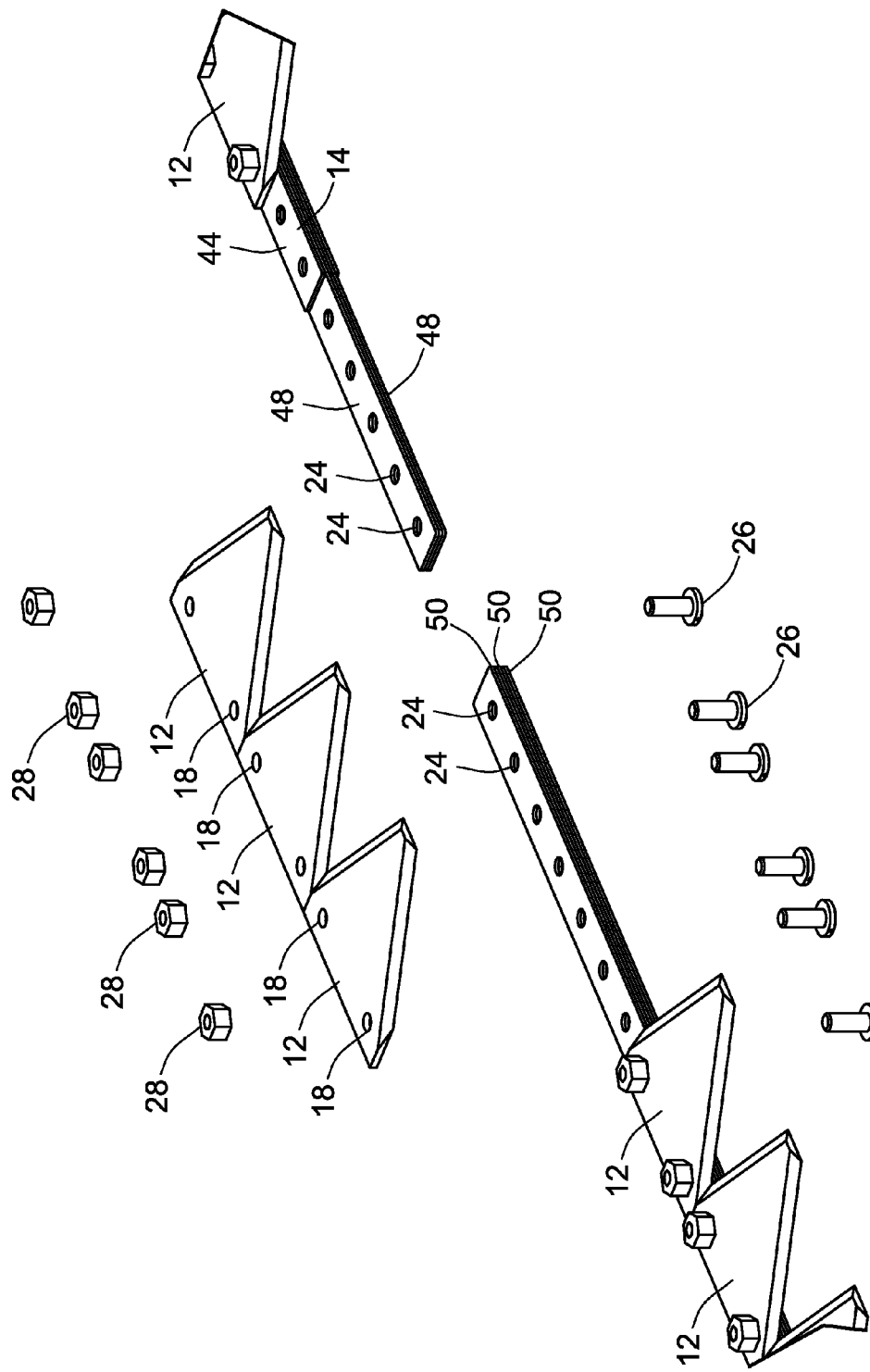
FIG. 15 is an enlarged detail view of FIG. 10 taken about Circle 15.

In accordance with an embodiment of the present invention, FIGS. 1-5 illustrate an embodiment of a sickle bar assembly comprising a plurality of sickle sections 12 and a plurality of elongated strips 14 of sheet steel material that are secured together in a laminated stack to form a sickle bar 16. As shown in the first embodiment, the laminated stack of elongated strips 14 run the entire horizontal length of the sickle bar 16. Thus, each of the strips 14 may run the entire length of the sickle bar.

As shown in the next embodiment (see e.g. FIGS. 6-15), and as will be discussed later on, each of the strips 14 may also be spliced together such that strips may form or run only a portion of the length, as may be the case in long sickle bar applications. In any event, and preferably, each elongated strip spans at least four sickle sections 12, and more preferably at least six sickle sections, and even more preferable, at least eight or ten sickle sections, or more.

Typically, and in the first embodiment, the sickle bar 16 and/or the individual laminated elongated strips 14 will extend a horizontal span of at least 1 meters; and more typically, at least 3 meters, but is usually less than 20 meters. When longer than 3 meters, then a methodology of joining different laminated stacks by way of a splice joint can be done as shown in the later embodiment of FIGS. 6-15. Typical overall bar thickness is between 1 and 8 mM; and depth/width is typically between 13 and 25 mM.

In preferred embodiments, the strips have a strength greater than about 180 KSI being formed from other than cold rolled steel as was used in prior art applications. For example, and preferably, the strips are heat treated strips having a strength greater than 230 KSI, and that may be 250 KSI or even higher. Yet, a further alternative material that may be employed for the strips 14 is high strength low alloy (HSLA). By employing a higher strength material, this provides for several benefits. As agricultural headers get wider, acquiring material in a form that meets the needs of the design continues to get more and more difficult. The laminated material concept allows the material to be purchased in the coil and rolled out to the desired length. The material may be machined while being rolled out or machined afterward. The laminated thin strip design also allows for heat treated materials to be incorporated into the sickle bar. Thus, while the length, width and thickness of the cutter bar or sickle bar, in the past, has prohibited the use of heat treated material, the present embodiments dealing with use of laminated strips specifically afford the ability to use such heat treated material. Several advantages can flow from this in that the higher strength will allow for higher cycle speeds and greater sickle length. Alternatively, or additionally, less material may be used due to the higher strength resulting in a reduced thickness to allow for a weight savings over conventional solid cold rolled steel knifeback material.

Each strip contained preferably has a thickness of less than 3 millimeters and then may be about 1 millimeter's thickness. With this relatively thin sheet material being used, the sickle bar may be at least three layers thick of strips in the vertical direction with the strips being stacked vertically upon each other in abutting relation. More preferably, the sickle bar is five or more layers employing five strips. Also, five strips is beneficial when forming a splice joint as shown in later embodiments where different strips can be offset and overlapped relative to each other.

As shown, each of the strips 14 may be arranged in a laminated stack, each in abutting relation to a next adjacent strip. In this manner, the strips collectively form a sickle bar 16 to which then as shown in FIG. 1, the individual sickle sections 12, can be mounted either to the top or bottom surface of the stack. As shown in FIG. 1, preferably the sickle sections mount to the top surface of the stack of strips 14, which form the sickle bar 16.

To facilitate mounting, the individual sickle sections 12 include each a pair of holes 18 formed in and through the base portion 20 of each sickle section 12. As is conventional, the knife portion 22 projects from the base section to facilitate cutting. Corresponding apertures 24 are formed through the sickle bar 16, which align with the corresponding holes 18 in the sickle sections 12. Bolts 26 are installed through corresponding holes 18 and apertures 24 with nuts attached at the end to fasten and secure the sickle sections 12 to the sickle bar 17. The bolts may have a non-round central section such as an oval shape and/or a polygonal shape with flats or other such non-round shape that corresponds to the shape of the holes 18 and apertures 24 to prevent rotation of bolts 26 when installed in the apertures 24 and holes 18.

As also shown, the sickle bar assembly 10 may include a reciprocating drive arm 30 integrally providing a hinge and pivot head 32 that would be mounted to the cutter bar assembly. Drive arm 30 is driven by appropriate drive means to facilitate back and forth reciprocating movement of the sickle bar assembly 10 when in operation. As shown, the reciprocating drive arm 30 may be mounted to the top of individual sickle sections toward one end of the sickle bar.

Turning then to the next embodiment, a sickle bar assembly 40 is illustrated that in many ways is similar to sickle bar assembly 10 of the first embodiment. As such, like reference numbers may be used for like component parts. However, in this second embodiment, the sickle bar assembly 40 includes a splice joint, generally indicated at FIG. 42 in FIG. 10 whereby the first bar segment 44 composed of multiple laminated strips 14 and a second bar segment 46 also composed of multiple laminated strips 14 are joined at this splice joint 42. Each bar segment includes at least three elongated strips secured together and preferably five strips as shown. The splice joint 42 is formed between the elongated strips of the first and second bar segments 44, 46 whereby ends of the two elongated strips of each of the first and second bar segments are offset relative to the other with the elongated strips of the first and second bar segments overlapped and preferably interleaved with each other.

For example, the first bar segment is shown to have one or more intermediate strips 48 that are sandwiched between sandwiching strips 50 of the second bar segment 46 in an embodiment. Where the sickle bar is five or more layers thick, each bar segment will thereby have at least two intermediate strips 48 projecting horizontally outward therefrom to provide two corresponding projecting fingers that project horizontally and are received into slot formed between three corresponding projecting fingers of the other bar segment (formed by e.g. the sandwiching strips 50).

To provide for sufficient rigidity and to carry the loads, the splice joint preferably spans at least two sickle sections 12 as illustrated in the drawings. Corresponding melting apertures 24 of the sickle bar segments 44 and 46 align with each other when the bar segments 44 and 46 are finger jointed together.

With this arrangement, sickle bars 16 of any desired size can be formed with thicker, or thinner sickle bars 16 being formed with the same thickness of strip material that may be required or desired for different applications. Additionally, various horizontal lengths of sickle bars can be accommodated through the splicing arrangement and long lengths of sickle bars can be accommodated without the need to provide correspondingly long lengths of strips 14 due to the splice joint 42.

Yet a further embodiment in the form of a kit 60 is shown in FIG. 16. This kit 60 may be shipped, for example to a farmer, or agricultural machinery repair shop in a relatively compact envelope, due to the relative thinness of the strip material provided by strips 14. More specifically, as shown in FIG. 16, a plurality of elongated strips 14 can be provided and wound up into a shipping position and then unwound to a generally flat state for assembly when the product arrives at the end user location. As shown, individual strips 14 may be wound into a coil with securing means such as some of the bolts 26 and nuts 28 securing the strip 14 in the coil 62 configuration or other such means as bands or other such retainers. The shape and diameter of the coils 62 is sufficiently large so as not to deform the strips past the yield point of the material of the strip. That way, each strip 14 retains its flat memory and once released from the coil 62 will return immediately to its generally flat state for assembly. The strips 14 have the corresponding apertures 24 so that the strips 14 may be unwound and then vertically stacked upon each other and assembled with corresponding sickle sections 12 to form the appropriate sickle bar assembly. Additional sickle section and/or bolts and nuts may be part of the kit as illustrated in FIG. 16.

Turning to FIG. 17, it can be seen that the bolts in the corresponding sickle bar holes and/or sickle sections holes may have non round openings as an alternative embodiment. In the previous embodiment, all of the holes were shown as circular as well as the shaft of the associated bolts. However, shoulder bolt like structures including rotation prevention device in the form of the square portion of the bolts 26 prime may be used. Other shapes, such as other polygons, splines, ovals, and/or other shapes may also be employed and are within the scope of the claims.

Turning then to FIG. 18, another alternative embodiment is illustrated in which a sickle bar 216 is formed by a spliced combination of a cold rolled solid bar segment 218 and a plurality of laminated elongated strips 214. A splice kit may be used to join cold rolled bars and laminated stacks together in such an alternative embodiment or as illustrated. A bottom portion, or top portion of the cold rolled bar segment 218 may be milled to provide a recess and relief 220 of which individual strips of laminated stack of strips 214 can overlap with aligned holes 222 provided to facilitate all together attachment. Thus, the laminated stack of elongated strips may be used in combination with cold rolled steel bar material. Thus, a higher strength material may be spliced in combination with a lower strength material. This may be particularly advantageous where the laminated strips of heat treated and higher strength material is arranged in those more critical areas where higher stress and fatigue is experienced such as nearer the drive ends as opposed to the middle sections of a sickle bar. Thus, less costly materials such as cold rolled steel may be employed in certain circumstances. As an alternative to that shown in FIG. 18, a standard splice kit could alternatively be used to join a laminated stack of elongated strips in and cold rolled bar segment together.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sickle bar assembly, comprising:
   a plurality of sickle sections; and
   a plurality of elongated strips secured together to form at least part of a sickle bar, the plurality of sickle sections secured to the sickle bar in side by side relation, with each elongated strip spanning at least 4 sickle sections
   wherein each strip has a thickness of less than 3 millimeters; and
   wherein the sickle bar is at least 3 layers thick of the strips in the vertical direction with the strips being stacked vertically upon each other in abutting relation, and wherein the sickle bar is at least 1 meter long in the horizontal direction.

2. The sickle bar assembly of claim 1, wherein the strips are heat treated strips of steel having strength of greater than about 180 KSI.

3. The sickle bar assembly of claim 1, wherein each strip has a thickness of less than 3 millimeters.

4. The sickle bar assembly of claim 1, wherein the sickle sections are mounted to a top or bottom surface of the sickle bar and not sandwiched between the strips.

5. The sickle bar assembly of claim 1, further comprising corresponding mounting holes in the sickle sections and mounting apertures in the sickle bar in co-alignment, the sickle sections being secured to the sickle bar with bolts fastened through aligned apertures and holes.

6. The sickle bar assembly of claim 5, wherein the mounting apertures and the mounting holes are non-circular in shape.

7. The sickle bar assembly of claim 1, wherein the sickle bar comprises at least two bar segments including:
   (a) a first bar segment and a second bar segment, each bar segment comprising at least 3 elongated strips secured together, (b) a splice joint formed between the elongated strips of the first and second bar segments, ends of at least two of elongated strips of each of the first and second bar segments being offset relative to each other with the elongated strips of the first and second bar segments interleaved with each other.

8. The sickle bar assembly of claim 1, wherein each strip being sufficiently flexible and resilient to be wound in a coil when in a shipping position and generally flat when in an unwound position for assembly, in the shipping position the shape of the coil being sufficiently large so as not to deform the strips past the yield point of material of the strip, each strip having regularly spaced mounting apertures adapted to align with the mounting holes of the sickle sections for mounting sickle sections in side by side relation along the length of the strips, the strips adapted to be secured together to form of sickle bar.

9. The sickle bar assembly of claim 1, wherein the plurality of elongated strips are spliced with a solid bar that is thicker than any of the strips individually.

10. The sickle bar assembly of claim 1, wherein each of the plurality of elongated strips spans eight sickle sections.

11. The sickle bar assembly of claim 1, wherein each of the plurality of elongated strips spans ten sickle sections.

12. The sickle bar assembly of claim 1, wherein each of the strips have a constant thickness from end to end along the entire length thereof.

13. A sickle bar assembly, comprising:
a plurality of sickle sections; and
a plurality of elongated strips secured together to form at least part of a sickle bar, the plurality of sickle sections secured to the sickle bar in side by side relation, with each elongated strip spanning at least 4 sickle sections;
wherein each strip has a thickness of less than 3 millimeters;
wherein the sickle bar is at least 5 layers thick of the strips in the vertical direction with the strips being stacked vertically upon each other in abutting relation, and wherein the sickle bar is at least 1 meter long in the horizontal direction.

14. The sickle bar assembly of claim 13, wherein the sickle sections are mounted to a top or bottom surface of the sickle bar and not sandwiched between the strips.

15. The sickle bar assembly of claim 13, wherein the sickle bar comprises at least two bar segments including:
(a) a first bar segment and a second bar segment, each bar segment comprising at least 3 elongated strips secured together,
(b) a splice joint formed between the elongated strips of the first and second bar segments, ends of at least two of elongated strips of each of the first and second bar segments being offset relative to each other with the elongated strips of the first and second bar segments interleaved with each other.

16. A sickle bar assembly, comprising:
a plurality of sickle sections; and
a plurality of elongated strips secured together to form at least part of a sickle bar, the plurality of sickle sections secured to the sickle bar in side by side relation, with each elongated strip spanning at least six sickle sections;
wherein the sickle bar is at least 3 layers thick of the strips in the vertical direction with the strips being stacked vertically upon each other in abutting relation and arranged uniformly in the horizontal direction such that a terminating end of the sickle bar forms a flat surface, wherein a terminating end of each of the plurality of elongated strips forms a part of the terminating end of the sickle bar.

\* \* \* \* \*